United States Patent [19]

Logan et al.

[11] Patent Number: 4,865,219

[45] Date of Patent: Sep. 12, 1989

[54] SERVING PLATTER FOR PIZZA PAN

[75] Inventors: Eugene T. Logan; Richard A. Barlow; James E. Logan, all of Salina, Kans.

[73] Assignee: Logan - Barlow, Saline, Kans.

[21] Appl. No.: 274,458

[22] Filed: Nov. 21, 1988

Related U.S. Application Data

[63] Continuation of Ser. No. 40,057, Apr. 20, 1987, Pat. No. 4,785,968.

[51] Int. Cl.$^4$ .............................................. A47J 37/01
[52] U.S. Cl. ........................... 220/410; 99/DIG. 15; 206/557; 220/405; 220/425; 220/426
[58] Field of Search ............... 220/410, 408, 405, 426, 220/427, 428, 23.33, 70, 72, 83, 425; 206/557; 99/DIG. 15

[56] References Cited

U.S. PATENT DOCUMENTS

| | | | |
|---|---|---|---|
| D. 58,200 | 6/1921 | Sailer | 220/70 X |
| D. 249,916 | 10/1978 | Collins | D7/356 X |
| 476,340 | 6/1892 | Wagandt | 99/DIG. 15 |
| 2,061,610 | 11/1936 | Burnette | 220/72 X |
| 2,206,694 | 7/1940 | Greene | 220/70 X |
| 2,218,724 | 10/1940 | Rudd | 220/410 X |
| 2,297,914 | 10/1942 | Pino | 99/DIG. 15 |
| 2,332,173 | 10/1943 | Shaffer | 220/427 |
| 2,545,528 | 3/1951 | Murray | 220/408 X |
| 2,621,496 | 12/1952 | O'Brien | 220/23.83 |
| 2,650,485 | 9/1953 | Greca | 220/23.83 |
| 3,164,285 | 1/1965 | Melich | 220/408 |
| 3,915,532 | 10/1975 | Ashton | 220/426 X |
| 4,519,219 | 5/1985 | Prepodnik et al. | 220/428 X |
| 4,563,946 | 1/1986 | Barlow et al. | 99/450 |
| 4,649,053 | 3/1987 | Lamonica | 99/DIG. 15 |
| 4,785,968 | 11/1988 | Logan et al. | 220/410 |

*Primary Examiner*—Steven M. Pollard
*Attorney, Agent, or Firm*—Head & Johnson

[57] ABSTRACT

A serving platter for supporting hot pizza pans to keep the pan from direct contact with the table where it is to be served.

13 Claims, 1 Drawing Sheet

U.S. Patent     Sep. 12, 1989     4,865,219
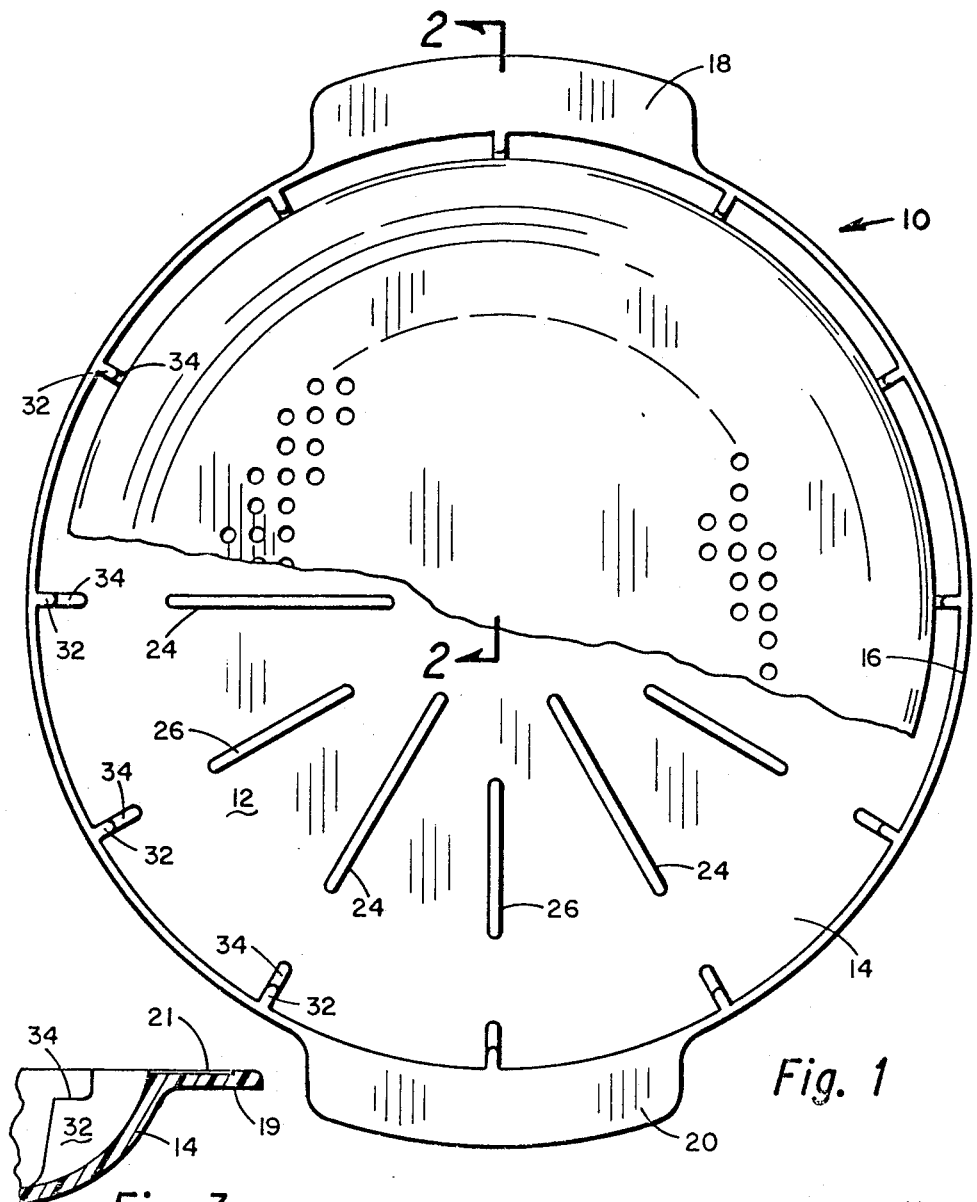
Fig. 1
Fig. 3
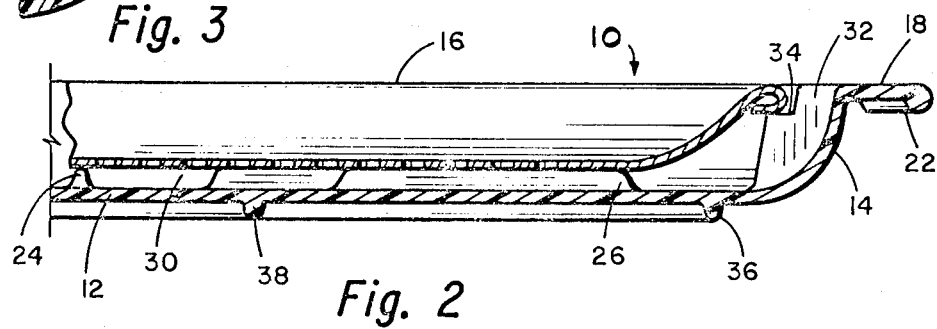
Fig. 2

4,865,219

SERVING PLATTER FOR PIZZA PAN

This is a continuation of co-pending application Ser. No. 040,057 filed on Apr. 20, 1987, now U.S. Pat. No. 4,785,968.

BACKGROUND OF THE INVENTION

The field of this invention is directed to a heat-proof serving tray or platter which is particularly capable of receiving a pizza pan.

The problem with such prior art devices is that they are not readily adaptable for use as a serving tray for a modern day pizza pan.

Typically in the serving of pizza, after it is baked in an oven, it is removed from the baking utensil, cut on a board and served on a platter or, it is retained in the original baking utensil then cut and served and placed on the table. In some instances, the original baking utensil is placed on some sort of insulating board or trivet. The latter method will keep the pizza hot longer, but will not allow moisture to escape. This causes an undesirable soft moist crust.

SUMMARY OF THE INVENTION

It is a particular object of the invention to provide a novel serving tray or platter which is capable of receiving a pizza pan or other similarly designed pan that has come directly from a flame or out of an oven and which is particularly characterized by high resistance to the passage of heat from the pizza pan to the table or other surface upon which the tray or platter rests.

It is a further object of this invention to provide a serving platter or receptacle for the placement of a hot pizza and pan when removed from the oven and thus protect the counter and persons from heat, moisture and food particles. In addition, the improved serving platter provides a means for cutting the pizza by providing supports which keep the pan from moving and/or tipping. External feet provide a stable non-slip base in addition to platter handles that provide a secure and comfortable grip while insulating the hands and fingers from the hot pizza pan.

Another object of the invention is to provide a serving platter for a pizza pan wherein internal support members also serve as a guide for the radial cutting of the pizza.

A further object of this invention is to provide a serving platter when a pizza pan of the type described in the aforementioned U.S. Pat. No. 4,563,946 that will maintain the pizza at a higher temperature longer and will maintain the crust thereof crisp because of the ventilating space between the bottom of the pizza pan and the bottom of the serving tray to allow the escape of steam that is removed by the natural convective air circulation that otherwise causes the bottom of a pizza to become soft and moist.

It is another object of the invention to provide a serving platter that is easily cleaned having open and smooth surfaces that may be washed in a dishwasher.

BRIEF DESCRIPTION OF THE DRAWINGS

FIG. 1 is a top elevational view, with a pizza pan partly cut away, of the serving platter of this invention.

FIG. 2 is a sectional view taken along the line 2—2 of FIG. 1.

FIG. 3 is a partial section view of an alternate rim handle for the platter.

DETAILED DESCRIPTION OF THE DRAWINGS

Before explaining the present invention in detail, it is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein is for the purpose of description and not of limitation.

Referring now to FIGS. 1 and 2, the serving platter is of a dish shape having a substantially flat bottom surface 12 which curves upwardly and outwardly from the bottom surface to form a rim 14 terminating at a top, substantially flat, edge 16. Formed as a part of edge 16 are diametrically opposed rim handles 18 and 20 which extend outwardly to a curved finger grip portion 22 as shown for one embodiment of a rim handle 18. An alternate embodiment is shown in FIG. 3 wherein handle 19 includes a recessed thumb grip portion 21, which is texturized for appearance and gripping purposes.

Extending upward from the inside of bottom surface 12 are a plurality of circumferentially spaced smoothly rounded radial risers 24 and 26 which create an air space 30 between the bottom of a pizza pan and the inside bottom surface of the platter. Around the internal periphery of the rim 14 are a plurality of circumferentially spaced radial ribs 32, each of which includes an indented ledge 34 to receive and support the outer periphery of a pizza pan as shown. The depth of the ledge 34 is preferably such that the top edge of the pizza pan is substantially flush with the top edge 16 of the platter. The radial ribs 32 are preferably circumferentially and equally spaced so as to provide a guide for the radial cutting of the pizza into sizes that may be desired by the consumer. Extending from the bottom surface 12 of the platter are a plurality of support feet 36 and 38 which in this instance are concentric support rings. The purpose of the support feet 36 and 38 are to provide a stable and in some instances a non-slip surface for the platter.

The platter is made of any suitable high temperature resistant plastic material such as glass-filled polyester, including materials that are microwave resistant and that can be easily molded or extruded and yet dishwasher safe.

The serving platter of the invention is particularly useful in combination with the pizza pan shown and described in U.S. patent no. 4,563,946 which is shown in the drawings herein in partial cross-section, and incorporated herein by reference. The combination permits the escape of steam from the bottom of the pan which prevents the lower crust of the pizza from becomming soggy.

What is claimed is:

1. A serving platter for circular pizza pans comprising:
 a dish shaped member with an upwardly and outwardly curved rim from a flat bottom having inside and outside surfaces to a top edge, rim handle means extending outward of said top edge of said dish shaped member,
 a plurality of circumferentially spaced radial risers extending upwardly from said inside bottom surface,
 a plurality of spaced radial ribs around the inner periphery of said rim, an indented ledge in each of said radial ribs to support the outer periphery of said pizza pan away from said inner periphery of said rim, and a support ring means extending below the outside of said bottom surface.

2. The serving platter of claim 1 wherein said radial ribs are equally spaced.

3. A serving platter for pizza pans comprising:
a dish shaped member with an upward and outward rim from an inside bottom surface to a top edge,
a spaced riser means extending upwardly from said inside bottom surface, and
a plurality of spaced radial ribs around the inner periphery of said rim having indented ledge means to support the outer periphery of said pizza pan away from said inner periphery.

4. The serving platter of claim 3 wherein said radial ribs are equally spaced.

5. The serving platter of claim 3 including support means extending before the outside of said bottom surface.

6. The serving platter of claim 5 wherein said support means comprises a plurality of concentric rings.

7. The serving platter of claim 5 wherein said support means includes a plurality of downwardly extending detents.

8. The combination of a pizza pan and a support platter therefor, said pizza pan comprising a substantially flat bottom, a large radius, smooth peripheral wall conterminous with the bottom as a uniform uninterrupted surface, the wall extending upwardly and outwardly therefrom, and a plurality of spaced relatively small apertures provided in the bottom and contained within a central area smaller than the diameter of the bottom leaving a border of no apertures for the event distribution of heat to the central underside of the pizza during a pizza baking operation; said support platter comprising a dish shaped member with an upward and outward rim from an inside bottom surface to a top edge, a plurality of spaced riser means extending upwardly from said inside bottom surface, a plurality of spaced radial ribs around the inner periphery of said rim having indented ledge means to receive and support the outer periphery of said pizza pan away from said inner periphery whereby air space exists between said pizza pan and said bottom surface.

9. The combination of claim 8 wherein said radial ribs are equally spaced.

10. The combination of claim 8 including support means extending below and outside of said bottom surface.

11. The combination of claim 10 wherein said support means comprises a plurality of concentric rings.

12. The combination of claim 10 wherein said support means includes a plurality of downwardly extending detents.

13. The combination of claim 8 wherein said platter includes opposite outer rim handles extending outward of said top edge of said dish shaped member.

* * * * *